United States Patent [19]

Ayers et al.

[11] Patent Number: 4,575,729

[45] Date of Patent: Mar. 11, 1986

[54] INK PRINTER PIVOTAL FRAME

[75] Inventors: Scott D. Ayers, Garland; John E. Comley, Plano; Ronald L. Hirt, Richardson; Barry C. Kockler, Lewisville, all of Tex.

[73] Assignee: The Mead Corporation, Dayton, Ohio

[21] Appl. No.: 625,418

[22] Filed: Jun. 28, 1984

[51] Int. Cl.⁴ ............................ G01D 15/18; B41J 1/22
[52] U.S. Cl. ................................... 346/75; 346/140 R; 346/145; 400/145; 400/691
[58] Field of Search ...................... 346/75, 140 R, 145; 400/145, 145.1, 691

[56] References Cited

U.S. PATENT DOCUMENTS

| | | | |
|---|---|---|---|
| 238,387 | 3/1881 | Hall | 400/691 |
| 3,580,515 | 5/1971 | Cassill | 239/536 |
| 3,805,273 | 4/1974 | Brady et al. | 346/75 |
| 4,080,607 | 3/1978 | Van Breemen et al. | 346/75 |
| 4,234,884 | 11/1980 | Vedder | 346/75 |
| 4,283,731 | 8/1981 | Bok et al. | 346/75 |
| 4,390,883 | 6/1983 | Stoneburner | 346/75 |
| 4,399,446 | 8/1983 | McCann et al. | 346/140 R |

Primary Examiner—E. A. Goldberg
Assistant Examiner—Gerald E. Preston
Attorney, Agent, or Firm—Biebel, French & Nauman

[57] ABSTRACT

An apparatus for printing paper sheets includes a sheet transport supported by a frame for carrying sheets past a print head along a generally planar paper path. The print head is mounted in a fixed but adjustable relationship with respect to the transport by a shaft rotatably mounted at each end to the frame to extend generally perpendicular to the paper path. A mounting plate has the print head secured thereto, and is in turn attached to the shaft whereby the mounting plate and the print head thereon are pivotable with the shaft from a normal position near the paper path to provide access to the path. A stop is provided for limiting pivotal movement of the plate towards the paper path. Provision is made for adjustment of the skew angle of the print head with respect to paper path, the lateral placement of the print head with respect to the path, and the distance of the print head from the paper path when in the normal position.

7 Claims, 5 Drawing Figures

INK PRINTER PIVOTAL FRAME

BACKGROUND OF THE INVENTION

The present invention relates generally to a mounting arrangement for a print engine, and more particularly, to such a mounting arrangement for use within a system for printing paper sheets wherein the sheets are tranported past an ink jet print head comprising a portion of the print engine.

A printing system for printing a plurality of moving sheets, typically includes unprinted sheets held in storage bins, a means for printing the sheets with ink, and drying apparatus. One example of such a system is a duplicator. Optional components such as a stacker, an inverter, a collator, or the like may be provided, and the system also includes means for transporting the sheets from one station to the next. The printing means may be an ink jet printer that deposits liquid ink upon a paper sheet in droplets as the sheet is moved by the transport means past the print head.

The print head itself represents one component of a larger print engine, which may include a plurality of print heads arrange to provide selected coverage of the sheet with ink at any loction thereon, along with fittings for connection of the heads to ink supplies, electrical control wiring, and the like. The print engine is mounted near the sheet transport path, which is typically defined by a movable belt upon which the sheets are carried. As the sheets move past the individual print heads, ink droplets are discharged onto the sheets for printing.

During operation of the printing system, it is occasionally necessary to gain access to the side of the print heads adjacent the transport path for servicing or inspection purposes. It may also be necessary from time to time to gain access to the transport path at the location of the print heads for clearance of paper jams. Accordingly, as shown in U.S. Pat. No. 4,080,607 issued March 21, 1978 to Van Bremen et al., a print engine mounting is provided in which the print engine is connected to the apparatus frame in part by a simple hinge. When access to the underside of the print heads is required, the engine is simply pivoted about the hinge.

While a simple access system such as that shown in Van Bremen et al. is effective for providing access to the print heads and transport path, the alignment achievable between the print heads and transport path in subject to change over the lifetime of the apparatus. Of course, it will readily recognized that such alignment is critical, since it will determine whether the print applied to each passing sheet is in proper registration with the sheet with respect to side margins along the sheet and the skew angle of the print upon the page. Further, unless distance between the print head and the sheet surface is properly maintained, the quality of the print upon the sheet will be adversely affected.

It is possible during assembly of the printing apparatus to take great care in properly aligning the print engine with respect to the transport path. Such an approach makes assembly of the apparatus tedious, time consuming, and more expensive, and requires that great care be taken in handling the equipment during shipping, operation, and servicing or inspection of the print engine to insure that proper alignment is maintained. Where provision is made for pivoting the print engine away from the transport path, such as is shown in Van Bremen et al., great care must also be taken in performing the pivoting operation or else inadvertent misalignment of the print engine with respect to the transport path may occur.

One alternative approach for providing alignment of a print head with respet to a transport system, in which alignment is made following assembly of the printing apparatus, is shown in U.S. Pat. No. 3,580,515, issued May 25, 1971 to Cassill. The printing apparatus includes a plurality of print heads supported by a pair of stepped supporting members disposed on either side of a moving paper web. A planar surface is disposed near one of the supporting members, with the individual print heads being urged against the planar surface to keep them in proper registration with the web. A mechanism is provided for shifting the planar surface so as to adjust the skew angle of the heads or to adjust the side margins defined upon the web as it is printed. This approach is limited, however, in that it does not provide any means of access to either the print heads or the paper transport path, short of removing the individual heads from the mounting arrangement. Moreover, no means is provided for adjusting the displacement of the print heads from the surface of the web to be printed.

What is needed, therefore, is a print engine mounting arrangement in which easy access is provided to both the print heads incorporated therein and to the sheet transport path. Such a mounting arrangement must also be capable of providing a means of adjustment of the print heads with respect to the sheets, including adjustments in skew angle, side margins and distance of the print heads from the surface of the sheets. Such adjustments should be capable of being made not only at the time of manufacture of the apparatus, to provide greater tolerances during assembly, but also after the apparatus has been placed in service.

SUMMARY OF THE INVENTION

The present invention provides an apparatus for printing paper sheets that includes a frame, at least one print head for depositing ink upon the sheets, and transport means supported by the frame for carrying the sheets past the print head along a generally planar paper path. An improved means for mounting the print head in a fixed but adjustable relationship with respect to the transport means includes a shaft rotatably mounted to the frame to extend above and generally laterally across the paper path. A pair of arms are carried on the shaft, and a mounting plate is attached to the arms and has means for securing the print head thereto. As a result, the print head and the mounting plate are pivotal with the shaft from a normal position near the paper path to provide access to the path.

The mounting means includes a means for supporting the mounting plate in its normal position having three support members, each support member having an outer end and being carried within the plate for supportive contact with the frame. Each support member further includes adjustment means for selectively adjusting the distance from the outer end to the mounting plate.

The mounting means may further include means for selectively shifting the arms laterally along the shaft while maintaining the arms in a circumferentially secured relationship to the shaft for pivotal movement about the shaft.

The mounting means may further include first and second spherical bearing assemblies mounted at each end of the shaft, the second bearing assembly being further secured to the frame for supporting its respective end of the shaft. A mounting block is carried on the frame, with the first bearing assembly being secured to the block for supporting the first end of the shaft. A means for adjusting the skew angle of the mounting plate and the print heads carried thereon with respect to the paper path is provided, including means for moving the mounting block along the frame in a direction parallel to the paper path.

Accordingly, it is an object of the present invention to provide a print engine mounting arrangement for a printing apparatus that is easily movable to permit access to both print heads and the paper transport path; to provide such a mounting arrangement that enables adjustment of the skew angle, lateral position and separation distance of the print heads with respect to the sheets to be printed; and to provide such an arrangement in which adjustment can be easily made either at the time of assembly of the printing apparatus or subsequent to its placement in service.

Other objects and advantages of the present invention will be apparent from the following description, the accompanying drawings, and the appended claims.

DETAILED DESCRIPTION OF THE PREFERRED EMBODIMENT

Figure 1:
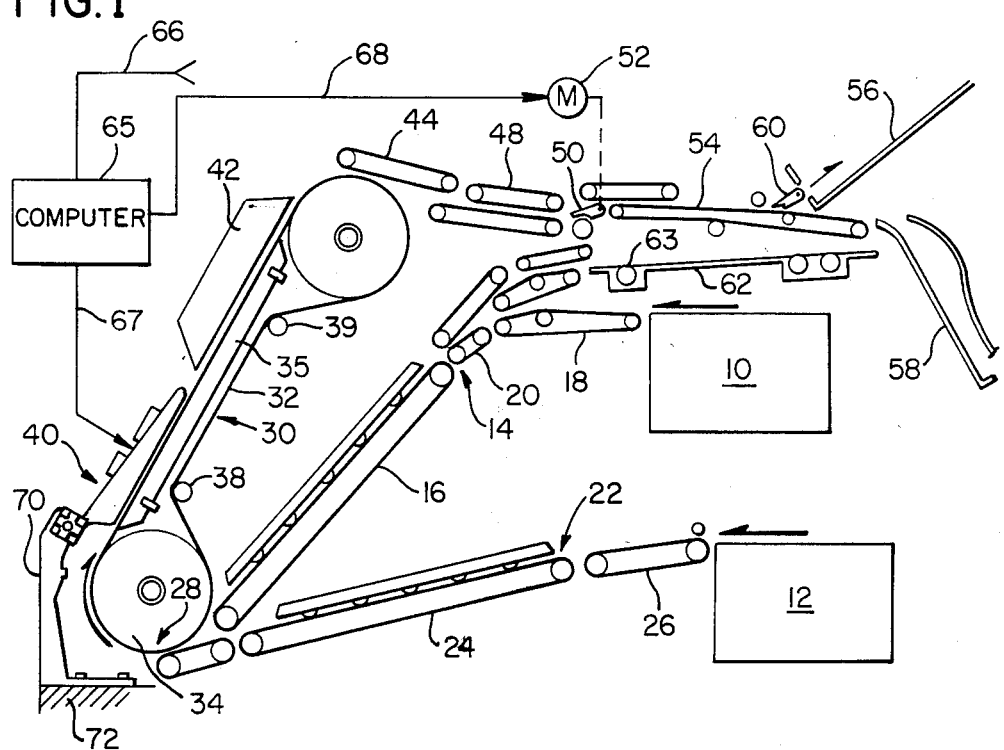
FIG. 1 is a schematic side view of a printing system with which the print head mounting means of the present invention may be used.

The means for mounting a print engine according to the present invention may be incorporated within a general sheet printing system such as that shown in FIG. 1. Sheets to be printed may be supplied by one or both of paper storage trays 10 or 12. Sheets of paper from sheet storage tray 10 are supplied to the receiving end 14 of a sheet registration device 16 by belt transports 18 and 20, while sheets from sheet storage tray 12 are transported to the receiving end 22 of a sheet registration device 24 by belt transport 26. The sheets are shifted laterally as they are transported through registration devices 16 and 24, to provide proper lateral alignment prior to delivery of the sheets to a common receiving point 28 at the lower end of an upwardly inclined transport means 30. A preferred configuration for registration devices 16 and 24 is described in detail in U.S. Pat. No. 4,440,389, issued April 13, 1984 to Ames et al.

Transport means 30 includes a set of vacuum belts 32, a vacuum drum 34, a vacuum plenum 35, an upper drum 36 and backing rollers 38 and 39, all arranged as illustrated. Transport mean 30 carries the sheets along the path which is preferably inclined upwardly about 60° from the horizontal. The sheets are carried on the belts 32 past a print engine 40, which includes a plurality of print heads, and will be described in detail below.

After being printed, the sheets are carried on belts 32 past a drying station 42 which dries the ink printed on the sheets by directing, for example, heated air or infrared or microwave radiation against the sheets moving therepast.

Upon reaching the uppermost portion of transport means 30, the sheets are passed to and carried by belt transports 44, 46 and 48 which move the sheets from transport means 30 to a gate 50, which may be selectively operated by a motor 52. The sheets may then be directed to an output transport 54. The transport 54 carries the sheets to an output sample tray 56 or, alternatively to an accumulator tray 58. Gate 60 deflects the sheets into tray 56 when pivoted into the position shown in FIG. 1.

As an alternative to being directed to output transport 54, sheets may be moved past gate 50 into inverting tray 62. Sheets which are delivered to inverting tray 62 are then directed toward registration device 16, which returns the sheets to the print engine 40 for reverse side printing. A vacuum roller 63 is provided for removing sheets from inverting tray 62 and moving them toward registration device 16.

A computer 65 is provided for controlling various operations within the printing apparatus. Signals are fed into computer 65 along line 66 from a document scanner (not shown) which scans original documents corresponding to the sheets to be printed. The computer 65 then controls print engine 40 as indicated by line 67, to provide for proper placement of ink upon the sheets moving therepast. As indicated by line 68, computer 65 also controls motor 52 to direct sheets from transport means 30 to their appropriate destination, depending upon whether the sheets are to be printed on a single side only, require printing on the reverse side, or have already been printed on both sides of the sheet.

Figure 2:
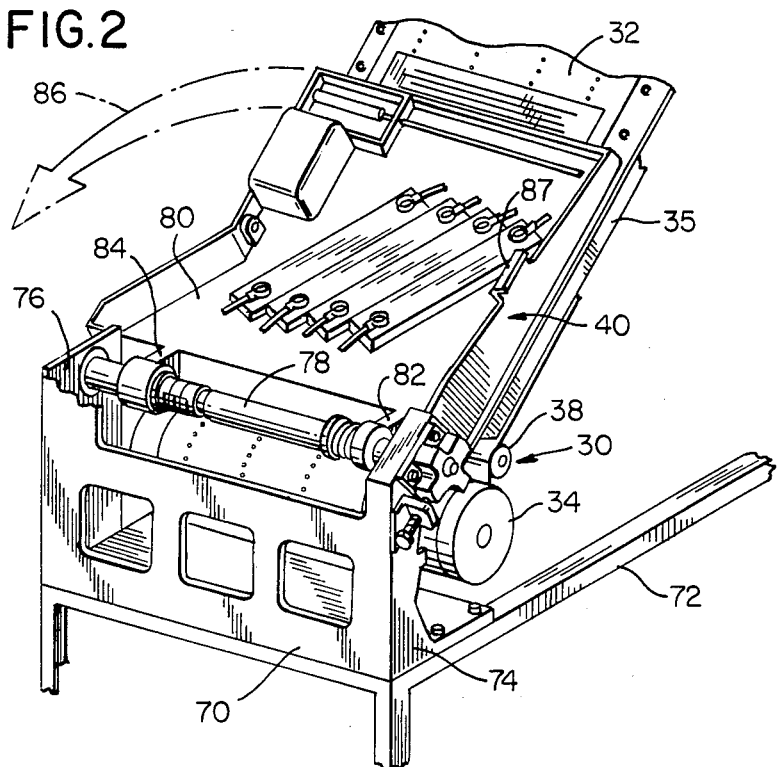
FIG. 2 is a perspective view of the print head mounting means and the portion of the printing system adjacent thereto.
Figure 3:
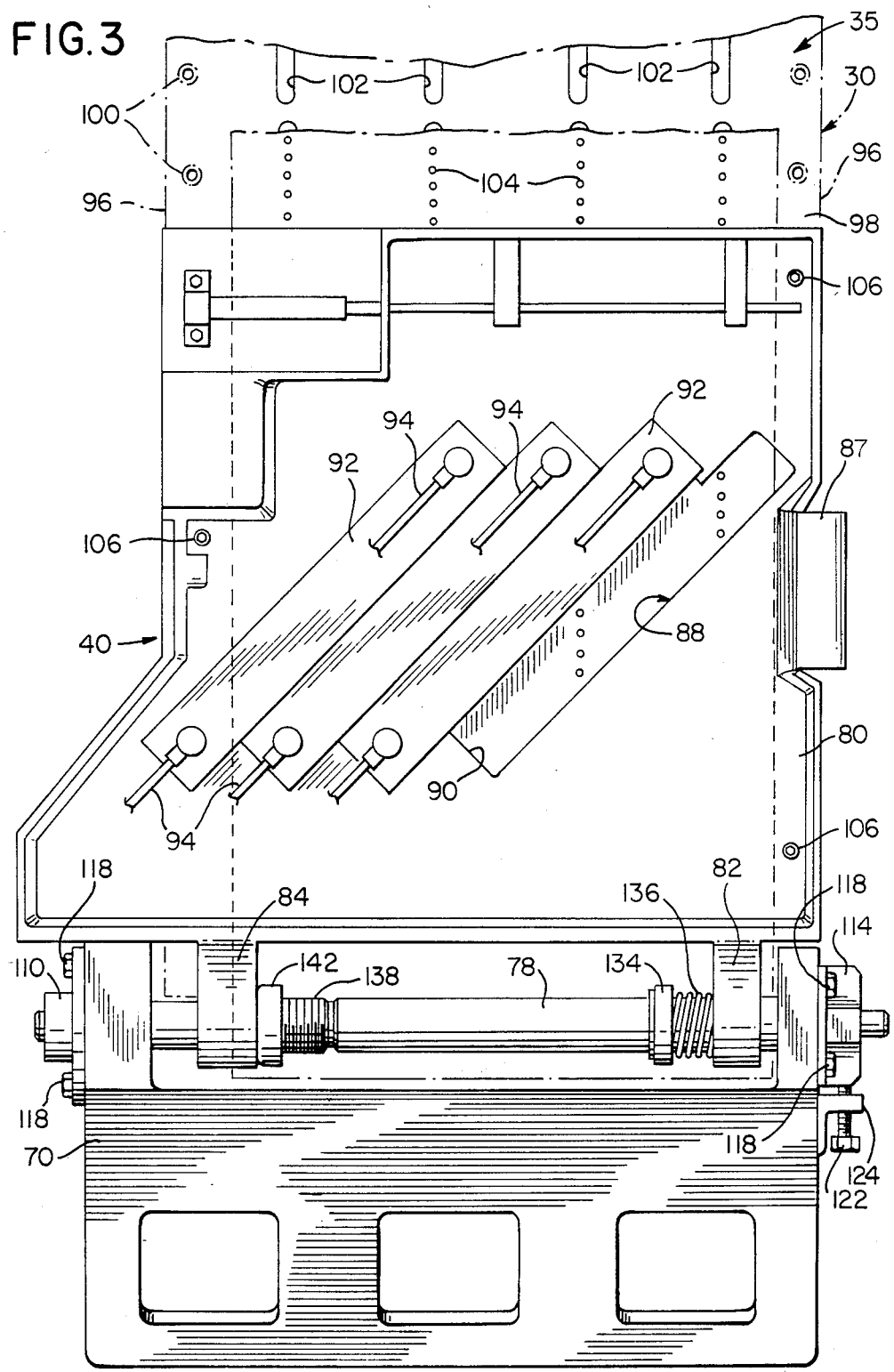
FIG. 3 is a top plan view of the print head mounting means.

The means for mounting print engine 40 within the printing system can be seen by reference to FIGS. 2 and 3. An upright frame portion 70 is secured to frame base 72. Frame portion 70 includes forward and rear side walls 74 and 76, respectively, across which a shaft 78 is rotatably mounted.

The components of print engine 40 is carried on a mounting plate 80 having a pair of arms 82 and 84 attached thereto. Arms 82 and 84 are in turn secured to shaft 78, as will be described below in detail, so that mounting plate 80, and therefore print engine 40, may be pivoted away from transport means 30 as indicated by arrow 86. A hand grip means 87 is provided at one edge of mounting plate 80 to facilitate pivotal movement.

Mounting plate 80 includes a central opening 88 that is positioned over vacuum belt 32 when plate 80 is in proper position for operation of the printing station. Opening 88 defines a series of four smaller interconnected rectangular openings 90, each of which is arranged in an angled fashion on mounting plate 80. An ink jet print head 92 is mounted to plate 80 immediately over each rectangular opening 90, so that ink droplets may be produced by each print head 92 for deposit upon a paper sheet carried along vacuum belt 32 beneath mounting plate 80. Of course, it will be recognized the depending upon the particular printing system, a number of print heads 92 other than four may be used. In any case, the number of openings 90 in mounting plate 80 will equal the number of print heads 92, although central opening 88 may also be formed so as not to specifically define an individual opening for each print head.

Any conventional print head 92 appropriate for the printing system may be used within print engine 40, and one example is disclosed in U.S. Pat. No. 4,390,883, issued June 28, 1983 to Stoneburner, which is hereby incorporated by reference. Each print head 92 is connected to ink circulation lines 94, which may in turn be connected to any appropriate ink supply system, such as that shown in U.S. Pat. No. 4,399,446, issued August 16, 1983 to McCann et al., and also hereby incorporated by reference. In addition, the print heads 92 will also include various electrical connections and the like, which may similarly be conventional in design and will therefore be known to those skilled in the art.

Figure 4:
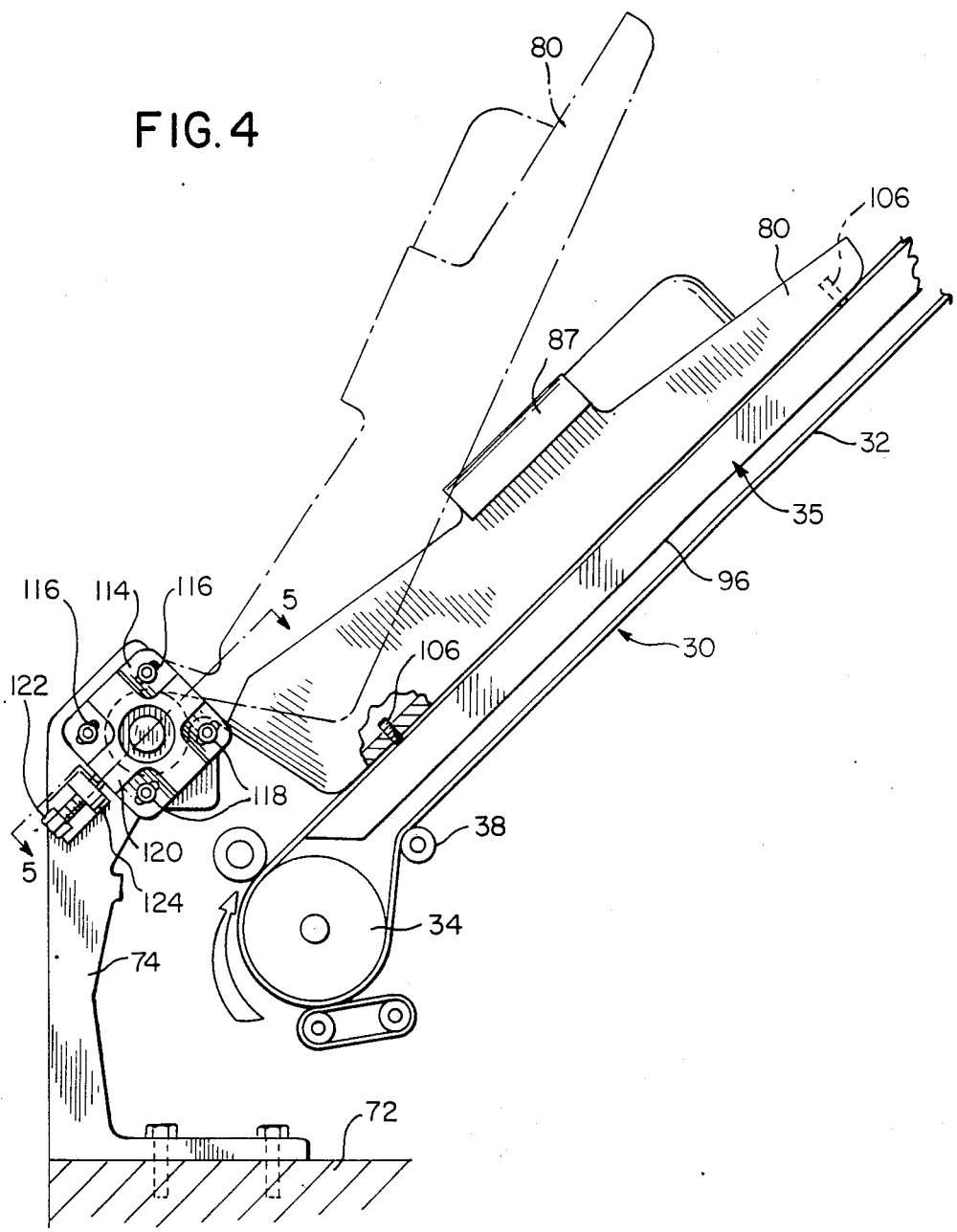
FIG. 4 is a side elevational view of the print head mounting means.

Referring to FIGS. 3 and 4, transport means 30 includes vacuum plenum 35 over which passes belt 32. Plenum 35 includes side frames 96 to which is mounted top plate 98, being attached thereto by a plurality of screws 100 or the like. A series of vacuum slots 102 are formed within top plate 98, extending in the direction of the sheet transport path. In addition, plenum 35 includes additional plates (not shown), such as along its bottom, to form an enclosed structure with the exception of slots 102. A vacuum supply (not shown) is connected to plenum 35 so that vacuum is applied at each of slots 102.

Belt 32 passes over and against top plate 98 of plenum 35, and includes several rows of vacuum holes 104 which pass over plate 98 against the series of slots 102. Thus, vacuum from plenum 35 is applied at holes 104 of the portion of belt 32 adjacent top plate 98.

After a paper sheet to be printed is delivered to transport means 30, it passes around vacuum drum 34. Drum 34 includes means (not shown) for applying vacuum to those holes 104 in belt 32 adjacent the drum 34 for carrying the sheet therearound. The sheet is then carried by belt 32 over vacuum plenum 35. The vacuum is applied to the sheet by plenum 35 through holes 104 in belt 32, and secures the sheet to the belt as it is passed beneath mounting plate 80 carrying print heads 92. Each print head, in accordance with the printing station control system (including computer 65) directs ink jet drops as necessary through opening 88 in plate 80 so as to be deposited upon the sheet for printing. Belt 32 then carries the sheet beyond plate 80 and to the remainder of the printing system shown in FIG. 1.

The means for adjusting the distance of the print heads 92 from the surface of a sheet to be printed is functionally a means for adjusting the distance of mounting plate 80 from the surface of vacuum belt 32. Three screws 106 are each mounted within threaded bores through plate 80. Two of screws 106 are disposed along one side edge of plate 80 near the corners thereof, as shown in FIG. 3. The third screw 106 is mounted near the opposite side edge of the plate 80 at approximately its midpoint. Each screw extends through plate 80 and contacts top plate 98 of vacuum plenum 35 near its side edges and beyond the side edges of belt 32.

Due to the weight of plate 80 and the print heads 92 and other components carried thereon, and due to the angle of its normal position, plate 80 will tend to pivot toward transport means 30. Therefore, screws 106 will serve as stops for such movement, and the extent to which screws 106 extend beyond the lower surface of plate 80 will determine its spacing from the surface of belt 32 when plate 80 is in its operating position. Consequently, by manipulating screws 106 with an appropriate tool, the distance of print heads 92 from the surface of a sheet to be printed can be readily adjusted. Of course, this adjustment can be not only with respect to the overall distance of the plate 80 from belt 32, but also to changes in the angle of plate 80 with respect to the surface of belt 32.

It should be recognized that more than three screws 106 may be used, and that members other than screws can be used so long as their degree of projection from mounting plate 80 can be conveniently adjusted and then maintained. Since three screws will permit full adjustment, it will normally not be desirable to provide a greater number, although it may be required in some circumstances. For example, the arrangement of components on mounting plate 80 may prohibit the disposition of screws 106 as shown in FIG. 3. In such a case, more screws may be needed to obtain adequate support while following full adjustment.

The means for adjusting the skew angle of the print heads 92 with respect to a sheet to be printed is performed by adjusting the skew angle of mounting plate 80 with respect to vacuum belt 32. This means may be seen in detail in FIGS. 4 and 5, and involves adjustment of the skew angle of shaft 78 from which mounting plate 80 is supported. Shaft 78 is carried between forward and rear side walls 74 and 76, respectively, of frame portion 70. A spherical bearing 108 carried within bearing housing 110 supports one end of shaft 78 at rear side wall 76. Bearing housing 110 is mounted to side wall 76 by an appropriate fastening device such as bolts 111. The opposite end of shaft 78 is supported by a second spherical bearing 112 carried within bearing housing 114. As seen in FIG. 4, housing 114 includes a plurality of slots 116. A bolt 118 extends through each slot 116, to secure bearing housing 114 to forward side wall 74.

Housing 114 includes a raised portion 120 extending across the width of bearing housing 114. A bolt 122 is engaged with a threaded bore formed within a bracket 124 secured to side wall 74. Bracket 124 is mounted so that bolt 122 extends in a direction parallel to the direction of travel of belt 32 across vacuum plenum 35. Bolt 122 is extended through bracket 124 until its leading end contacts raised portion 120 of bearing housing 114.

To adjust the skew angle of mounting plate 80, bolts 116 are slightly loosened so as to permit sliding movement of bearing housing 114 in the direction of slots 116. Bolt 122 is then manipulated, so that a controlled sliding movement of bearing housing 114 in either direction can be produced. Once the skew angle of shaft 78 has been adjusted, bolts 116 are retightened. By virtue of the spherical bearings 108 and 112, such adjustments in skew angle of shaft 78 with respect to side walls 74 and 76 will not affect the rotational abilities of shaft 78 for pivotal movement of mounting plate 80.

Figure 5:
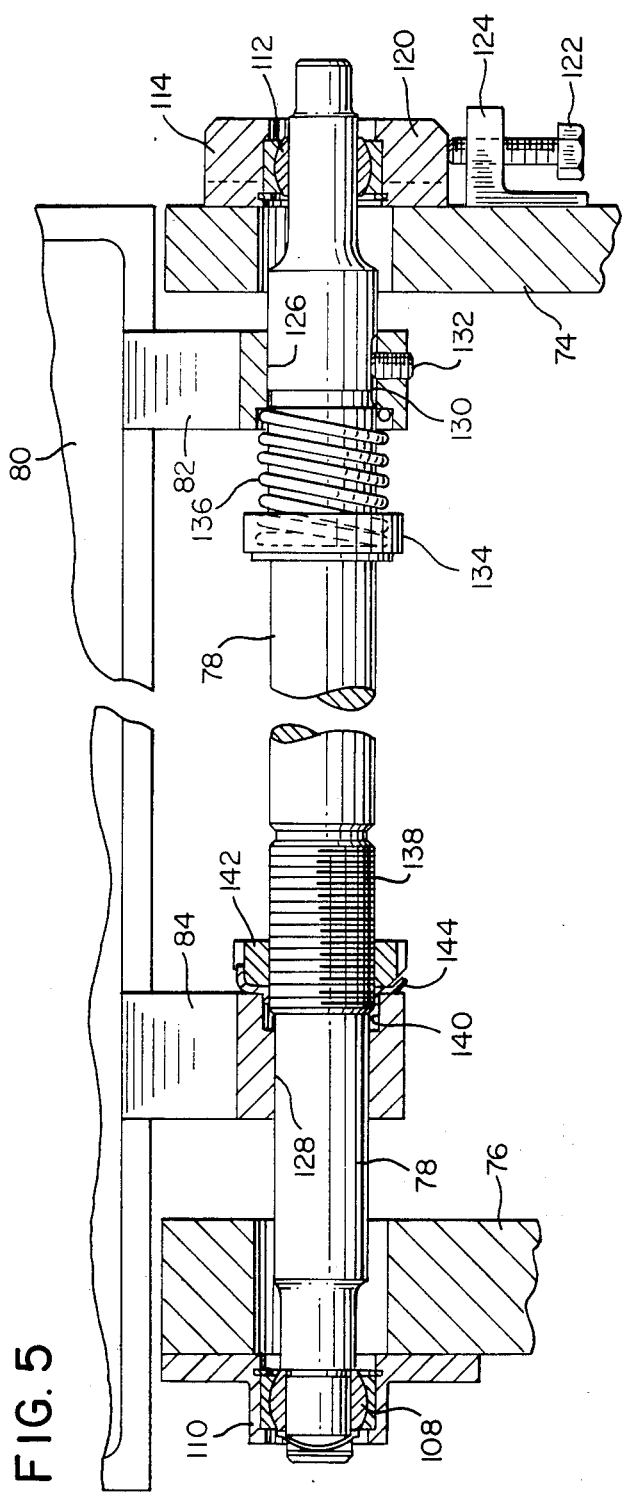
FIG. 5 is a view taken generally along line 5—5 of FIG. 4.

Adjustments in the side margins of print placed upon a sheet are effectively made by adjusting the positioning of mounting plate 80 along shaft 78 in a direction lateral to that of movement of vacuum belt 32. As shown in FIG. 5, each arm 82 and 84 is provided with a bore 126 and 128, respectively, through which shaft 78 passes. A slot 130 is formed into shaft 78 along the portion of the shaft placed within bore 126. A set screw 132 is mounted within a threaded bore through arm 82 for engagement with slot 130 to prevent circumferential shifting of arms 82 and 84 about shaft 78. Thus, when mounting plate 80 is pivotally lifted, shaft 78 rotates along with arms 82 and 84. However, set screws 132 does not affect the ability of arms 82 and 84 to slide laterally along shaft 78.

An annular collar 134 is secured to shaft 78 near arm 82. A spring 136, placed on shaft 78, is disposed between collar 134 and arm 82. Shaft 78 is further provided with a threaded portion 138 adjacent arm 84. Bore 128 includes a widened region 140 so that threaded portion 138 may extend partially into bore 128.

A nut 142 is engaged with threaded portion 138 of shaft 78. A locking washer 144 is placed on shaft 78 between nut 142 and arm 84. Nut 142 is then rotated until it is secured against the side of arm 84.

Spring 136 is selected so as to be slightly compressed even when mounting plate 80, and hence arms 82 and 84, are in their futhermost position to the right in FIG. 5. As a result, spring 136 exerts force against arm 82, which in turn causes arm 84 to exert force against nut 142 and locking washer 144. Therefore, adjustments in the lateral positioning of mounting plate 80 can be made by manipulation of nut 142.

To move mounting plate 80 to the left in FIG. 5, nut 142 is advanced along threaded portion 138 toward arm 84. Both arms 84 and 82 will therefore be moved to the left along shaft 78, thereby further compressing spring 136. Since spring 136 in turn exerts force against arm 82 in a righthand direction, arm 84 will be held in position against nut 142 and locking washer 144 once manipulation of nut 142 has been completed. Thus, the lateral position of mounting plate 80 will be secure.

To adjust mounting plate 80 to the right, nut 142 is manipulated in a direction along threaded portion 138 away from arm 84. Due to spring 136 exerting force against arm 82, arm 84 will follow movement of nut 142 to the right, and therefore will be held securely against nut 142 and locking washer 144. Mounting plate 80 will thus be moved in a right-hand direction.

While the form of apparatus herein described constitutes a preferred embodiment of this invention, it is to be understood that the invention is not limited to this precise form of apparatus, and that changes may be made therein without departing from the scope of the invention, which is defined in the appended claims.

What is claimed is:

1. In an apparatus for printing paper sheets having a frame, at least one print head for depositing ink upon the sheets, and tranport means supported by the frame for carrying the sheets past the print head along a generally planar paper path, the improvement comprising means for mounting the print head in a fixed but adjustable relationship with respect to the transport means, said mounting means including:

a shaft having first and second ends;
first rotational mounting means secured to said frame for rotatably supporting said first end of said shaft;
second rotational mounting means for rotatably supporting said second end of said shaft so that said shaft extends generally perpendicular to the paper path;
means for securing said second rotational mounting means to said frame;
a mounting plate having means for securing the print head thereto;
means for attaching said mounting plate to said shaft, whereby said mounting plate and the print head thereon are pivotable with said shaft from a normal position near the paper path to provide access to the path; and
stop means for limiting pivotal movement of said plate towards the paper path;
said means for securing said second rotational mounting means to said frame including means for enabling selective movement of said second rotational mounting means with respect to the frame in a direction parallel to the paper path, whereby the skew angle of said mounting plate and the print head with respect to the paper path may be adjusted.

2. The apparatus as defined in claim 1, wherein: said first rotational mounting means includes a first spherical bearing disposed about said shaft at said first end and a first being housing mounted to the frame for containing said first bearing;
said second rotational mounting means includes a second spherical bearing disposed about said shaft at said second end and a second bearing housing for containing said second bearing, and means for securing said second bearing housing to the frame; and
said means for enabling selective movement of said second rotational mounting means with respect to the frame includes means for selectively moving said second bearing housing upon partial release of said means for securing said second bearing housing to the frame.

3. The apparatus as defined in claim 2, wherein:
said means for enabling selective movement of said second bearing housing includes said second housing defining a plurality of slots through said housing, each of said slots extending in a direction parallel to the paper path; and
said means for securing said second bearing housing to the frame includes one bolt for each of said slots, each of said bolts being inserted through one of said slots for securing to the frame.

4. The apparatus as defined in claim 3, wherein said means for enabling selective movement of said second bearing housing further includes a bracket mounted to the frame near said second bearing housing and having a threaded bore defined therethrough, and a bolt engaged with said bore for disposition in a direction parallel to the paper path and for contact of its leading end with said second bearing housing.

5. In an apparatus for printing paper sheets having a frame, at least one print head for depositing ink upon the sheets, and transport means supported by the frame for carrying the sheets past the print head along a generally planar paper path, the improvement comprising means for mounting the print head in a fixed but adjustable relationship with respect to the transport means, said mounting means including:

a shaft having first and second ends;
first rotational mounting means secured to said frame for rotatably supporting said first end of said shaft;
second rotational mounting means for rotatably supporting said second end of said shaft so that said shaft extends generally perpendicular to the paper path;
means for securing said second rotational mounting mean to said frame;
a mounting plate having means for securing the print head thereto;
means for attaching said mounting plate to said shaft, whereby said mounting plate and the print head thereon are pivotable with said shaft from a normal position near the paper path to provide access to the path; and
stop means for limiting pivotal movement of said plate towards the paper path;
said means for attaching said mounting plate to said shaft including a pair of arms connected to said mounting plate and adapted for mounting to said shaft, means for selectively shifting said arms laterally along said shaft, and means for securing said arms circumferentially to said shaft for pivotal movement thereabout, whereby the lateral displacement of said mounting plate and the print head with respect to the paper path may be adjusted;

said means for selectively shifting said arms laterally along said shaft including means fixed to said shaft for biasing movement of one of said arms in one lateral direction along said shaft, stop means disposed along said shaft for cooperation with one of said arms to limit said biasing movement, and means for selective lateral movement of said stop means along said shaft;

said biasing means including a collar fixed to said shaft and spring means extending between said collar and one of said arms, said spring means being selected so as to be slightly compressed for any selectable lateral position of said one arm along said shaft.

6. The apparatus as defined in claim 5, wherein said spring means is a coil spring disposed about said shaft.

7. The apparatus as defined in claim 5, wherein said stop means and said means for lateral movement of said stop means include a threaded portion defined along a portion of said shaft adjacent one of said arms and extending partially into said bore defined therethrough, and nut means engaged with said threaded portion for lateral movement therealong.

* * * * *